(12) United States Patent
Madaelil et al.

(10) Patent No.: US 11,907,712 B2
(45) Date of Patent: Feb. 20, 2024

(54) METHODS, SYSTEMS, AND APPARATUSES FOR OUT-OF-ORDER ACCESS TO A SHARED MICROCODE SEQUENCER BY A CLUSTERED DECODE PIPELINE

(71) Applicant: Intel Corporation, Santa Clara, CA (US)

(72) Inventors: Thomas Madaelil, Austin, TX (US); Jonathan Combs, Austin, TX (US); Vikash Agarwal, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 17/033,649

(22) Filed: Sep. 25, 2020

(65) Prior Publication Data
US 2022/0100500 A1   Mar. 31, 2022

(51) Int. Cl.
G06F 9/30      (2018.01)
G06F 9/22      (2006.01)
G06F 9/38      (2018.01)

(52) U.S. Cl.
CPC ............. *G06F 9/223* (2013.01); *G06F 9/382* (2013.01); *G06F 9/3802* (2013.01); *G06F 9/3822* (2013.01); *G06F 9/3844* (2013.01)

(58) Field of Classification Search
CPC ....... G06F 9/223; G06F 9/3802; G06F 9/3822
See application file for complete search history.

(56) References Cited

U.S. PATENT DOCUMENTS 5,630,083 A * 5/1997 Carbine .............. G06F 9/30145
                                              712/E9.072
5,913,049 A * 6/1999 Shiell .................. G06F 9/30098
                                              712/E9.059

(Continued)

OTHER PUBLICATIONS

Intel, "Intel (Registered) 64 and IA-32 Architectures Optimization Reference Manual", Order No. 248966-033, Jun. 2016, 672 pages.

*Primary Examiner* — Jacob Petranek
(74) *Attorney, Agent, or Firm* — NICHOLSON DE VOS WEBSTER & ELLIOTT LLP

(57) ABSTRACT

Systems, methods, and apparatuses relating to circuitry to implement out-of-order access to a shared microcode sequencer by a clustered decode pipeline are described. In one embodiment, a hardware processor core includes a first decode cluster comprising a plurality of decoder circuits, a second decode cluster comprising a plurality of decoder circuits, a fetch circuit to fetch a first block of instructions and send the first block of instructions to the first decode cluster for decoding, and fetch a second block of instructions younger in program order than the first block of instructions and send the second block of instructions to the second decode cluster for decoding, a microcode sequencer comprising a memory that stores a plurality of micro-operations, and an arbitration circuit to arbitrate access by the first decode cluster and the second decode cluster to a shared read port of the memory, wherein the arbitration circuit is to allow the second decode cluster decoding the second block of instructions access to the shared read port of the memory instead of the first decode cluster decoding the first block of instructions when an instruction of the second block of instructions has a number of corresponding micro-operations in the microcode sequencer below an arbitration threshold.

24 Claims, 14 Drawing Sheets

(56) References Cited

U.S. PATENT DOCUMENTS

| | | | | |
|---|---|---|---|---|
| 6,363,471 | B1* | 3/2002 | Meier | G06F 9/30036 |
| | | | | 712/E9.055 |
| 6,968,444 | B1* | 11/2005 | Kroesche | G06F 9/3822 |
| | | | | 712/215 |
| 2001/0032307 | A1* | 10/2001 | Rohlman | G06F 9/3867 |
| | | | | 712/E9.055 |
| 2012/0079242 | A1* | 3/2012 | Madduri | G06F 9/3822 |
| | | | | 712/E9.033 |
| 2018/0173534 | A1* | 6/2018 | Peled | G06F 9/3806 |
| 2019/0361699 | A1* | 11/2019 | Troester | G06F 9/30145 |
| 2021/0182724 | A1* | 6/2021 | Zou | G06N 10/00 |

\* cited by examiner

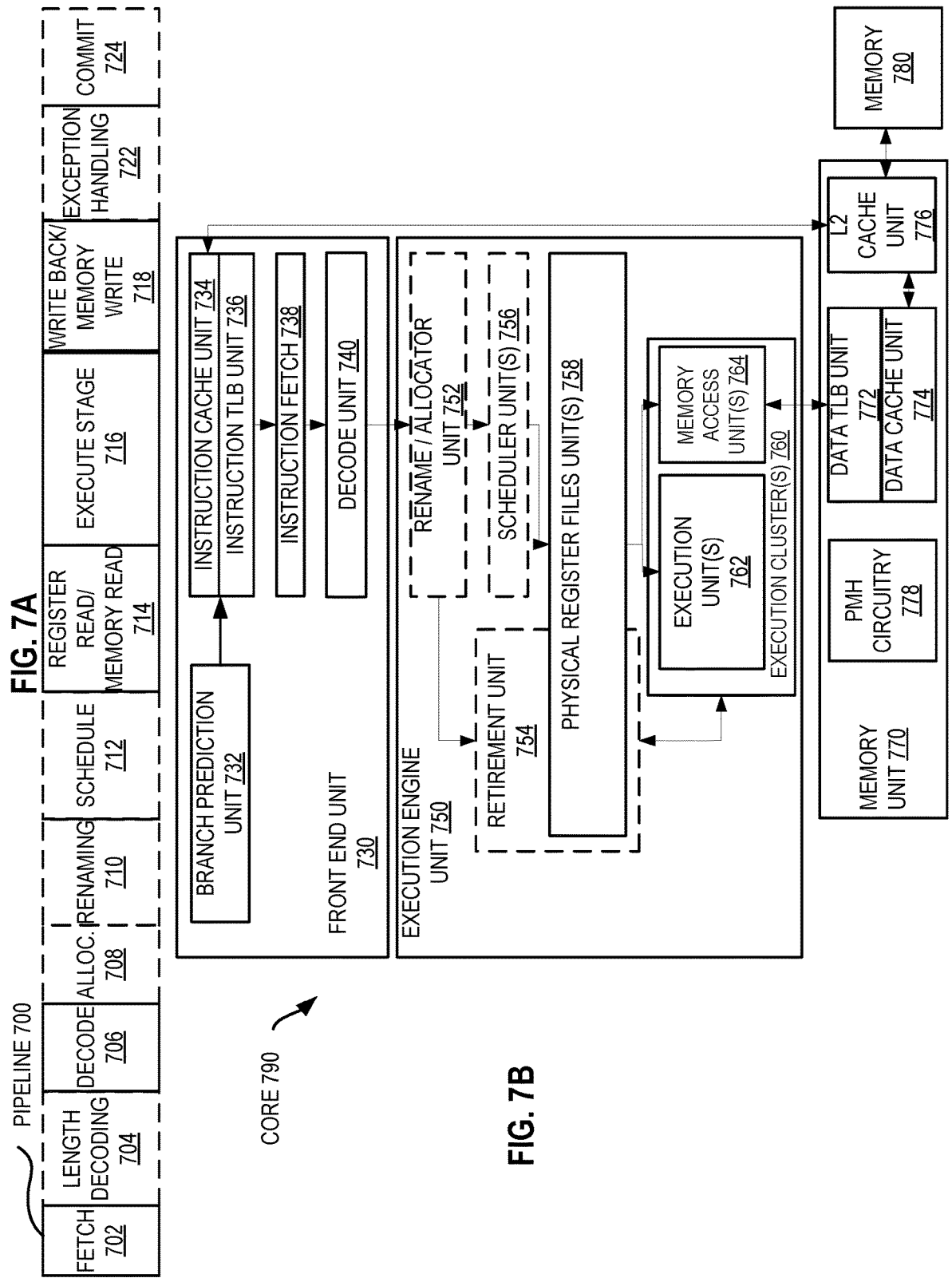

US 11,907,712 B2

METHODS, SYSTEMS, AND APPARATUSES FOR OUT-OF-ORDER ACCESS TO A SHARED MICROCODE SEQUENCER BY A CLUSTERED DECODE PIPELINE

TECHNICAL FIELD

The disclosure relates generally to electronics, and, more specifically, an embodiment of the disclosure relates to circuitry to implement out-of-order access to a shared microcode sequencer by a clustered decode pipeline.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 7A is a block diagram illustrating both an exemplary in-order pipeline and an exemplary register renaming, out-of-order issue/execution pipeline according to embodiments of the disclosure.

FIG. 7B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
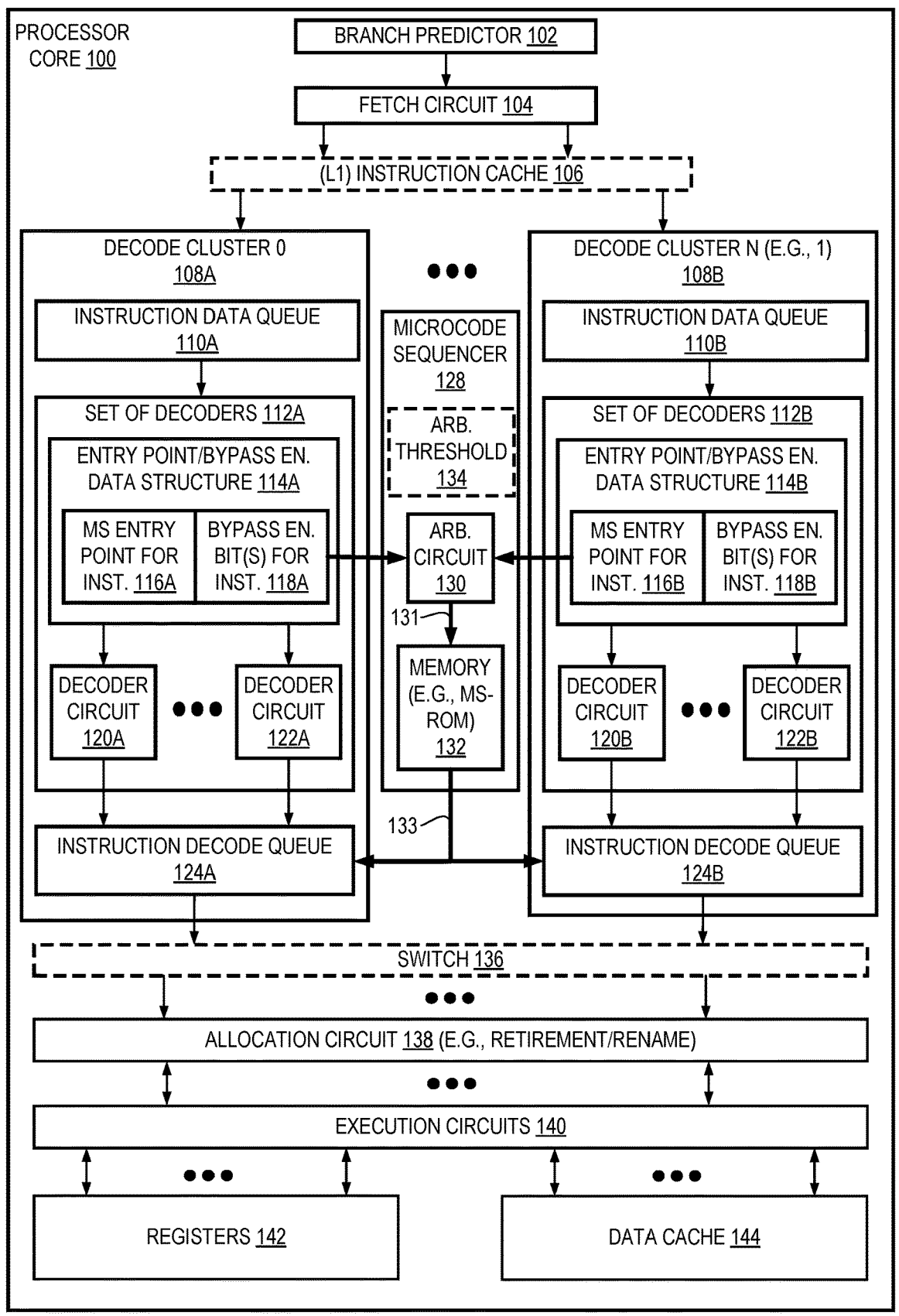
FIG. 1 illustrates a processor core having a plurality of decode clusters and a shared microcode sequencer according to embodiments of the disclosure.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (μops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA). In certain embodiments, the translation of an instruction into one or more micro-operations is associated with the instruction fetch and/or decode portion of a processor's pipeline.

In certain processors, microcode (e.g., comprising micro-operations) is stored in a memory (e.g., read-only memory (ROM)) of the processor, for example, with the ROM generally referred to as a microcode ROM or μROM. Reading of microcode (e.g., reading of one or more micro-operations) out of a read-only memory is performed by a microcode sequencer (e.g., microcode sequencer circuit) of the processor in certain embodiments. In one embodiment, the data (e.g., micro-operations) in the read-only memory is stored there during the manufacturing process, for example, the data is not modifiable (e.g., when in possession by a consumer). Thus, in certain embodiments, the non-modifiable nature of a read-only memory storing microcode prevents updates to that microcode. Certain processors include a patch memory that is used to patch one or more micro-operations of the read-only memory. For example, where a processor is to, for an instruction that is to be executed, source a set of micro-operations for the instruction from the patch memory instead of the (e.g., obsolete) set of micro-operations for the instruction stored in the read-only memory. In certain embodiments, the data stored in the patch memory is modifiable (e.g., when in possession by a consumer).

Certain processors (e.g., certain cores) may implement a plurality of decode clusters (e.g., with each cluster having a plurality of decoder circuits), e.g., as a way to efficiently increase decode bandwidth. In certain embodiments, a decoder circuit is to decode a (e.g., macro) instruction into a set of one or more micro-operations that are to be executed (e.g., as a primitive) by an execution circuit(s). In one embodiments, a decoder circuit is to decode certain (e.g., macro) instructions into a corresponding set of one or more micro-operations without utilizing a microcode sequencer (e.g., a microcode sequencer separate from any decode cluster and/or decoder circuit) and other (e.g., macro) instructions into a corresponding set of one or more micro-operations by utilizing the microcode sequencer (e.g., the microcode sequencer separate from any decode cluster and/or decoder circuit). In one embodiment, a decoder circuit is to output a certain number of micro-operation per cycle (e.g., one micro-operation per cycle and/or between one and four micro-operations per cycle).

FIG. 1 illustrates a processor core 100 having a plurality of decode clusters 108A-108B and a shared microcode sequencer 128 according to embodiments of the disclosure. Processor core 100 may be one of a plurality of cores of a processor, e.g., of a system. Depicted processor core 100 includes a branch predictor 102 (e.g., to predict one or more branches of the code (e.g., instructions) that are to be executed by the processor core 100.

In certain embodiments, branch operations (e.g., instructions) are either unconditional (e.g., the branch is taken every time the instruction is executed) or conditional (e.g., the direction taken for the branch is dependent upon a condition), for example, where instructions to be executed following a conditional branch (e.g., conditional jump) are not known with certainty until the condition upon which the branch depends is resolved. Here, rather than wait until the condition is resolved, branch predictor 102 (e.g., branch predictor circuit) of a processor may perform (e.g., speculative execute) a branch prediction to predict whether the branch will be taken or not taken, and/or (e.g., if predicted to be taken) predict the target instruction (e.g., target address) for the branch. In one embodiment, if the branch is predicted to be taken, the processor core 100 fetches and speculatively executes the instruction(s) for the taken direction (e.g., path) of the branch, e.g., the instructions found at the predicted branch target address. The instructions executed following the branch prediction are speculative in certain embodiments where the processor has not yet determined whether the prediction is correct. In certain embodiments, a processor core 100 resolves branch instructions at the back end of the pipeline circuitry (e.g., in execution circuit(s) 140, and/or retirement (write back) circuit 138). In one embodiment, if a branch instruction is determined to not be taken by the processor (e.g., by the back end), then all instructions (e.g., and their data) presently in the pipeline circuitry behind the taken branch instruction are flushed (e.g., discarded). In certain embodiments, the branch predictor 102 (e.g., branch predictor circuit) learns from past behavior of branches to predict a next (e.g., incoming) branch. In certain embodiments, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

Figure 2:
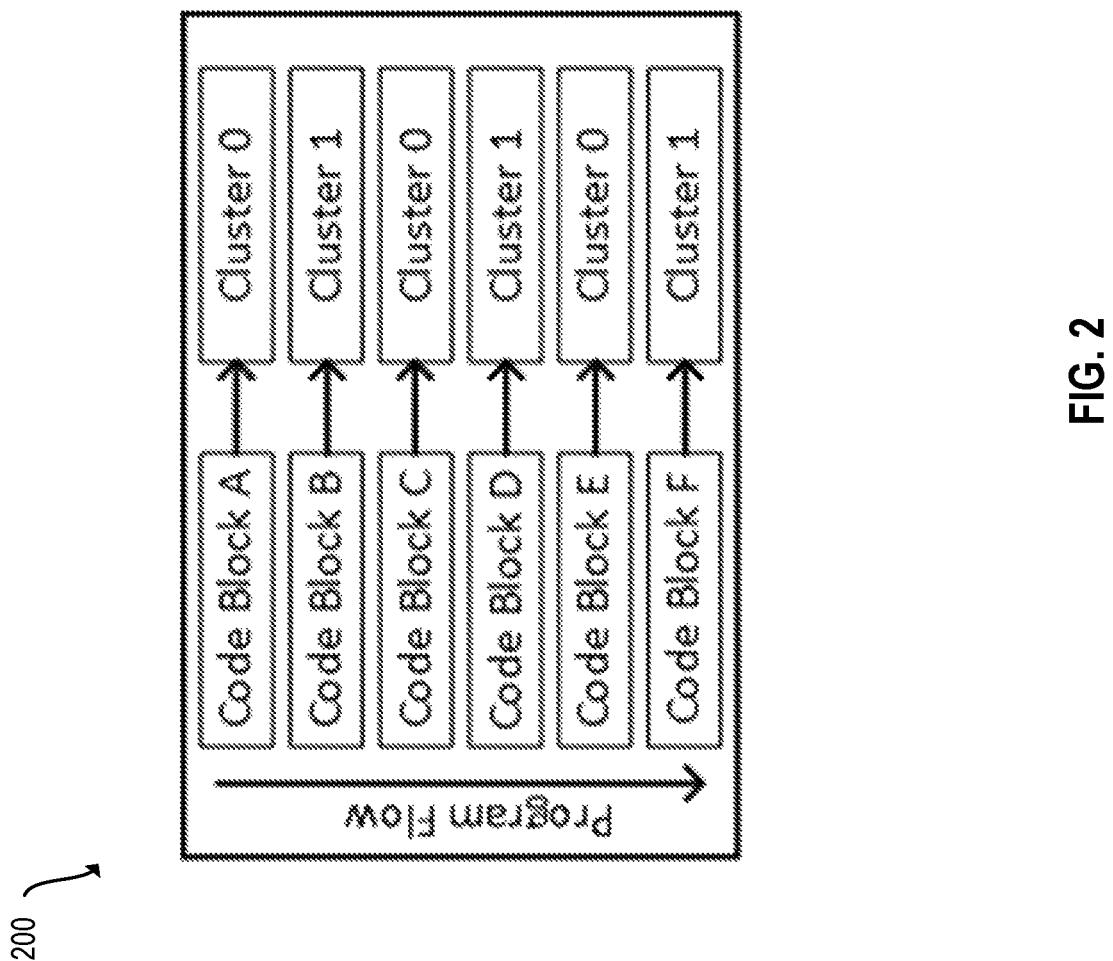
FIG. 2 illustrates an example clustered decode program flow according to embodiments of the disclosure.

FIG. 2 illustrates an example clustered decode program flow 200 according to embodiments of the disclosure, for example, with cluster 0 being decode cluster 108A in FIG. 1 and cluster 1 being decode cluster 108B in FIG. 1. Program flow 200 illustrates the (e.g., program) code (e.g., instructions) that is divided into code blocks A-F (e.g., with A being the "oldest" block of code in program order and F being the "youngest" block of code in program order), and each code block assigned to either decode cluster 0 or decoder cluster 1 for decoding.

Referring again to FIG. 1, the processor core 100 (e.g., via the fetch circuit 104 and/or branch predictor 102) may send the blocks of instructions (e.g., blocks A-F in FIG. 2) to a decode cluster, for example, with a first block A of instructions sent to decode cluster 0 108A, a (next in program order, e.g., younger) second block B of instructions sent to decode cluster N 108B, etc. In a two-cluster example, a third (next in program order, e.g., younger) block C of instructions may be sent to the next available decode cluster (e.g., after it has finished decode of its current block of instructions). In a two-cluster example, a third (next in program order, e.g., younger) block C of instructions may be sent to the next decode cluster (e.g., to decoder cluster 108A in this example). Although two decode clusters 108A-108B are shown, it should be understood that three or more decode clusters may be utilized (e.g., where "N" is a positive integer greater than one), for example, with all of the three or more decode clusters using a single microcode sequencer (e.g., all of the three or more decode clusters arbitrating for a single (e.g., the only) read port of a microcode sequencer (e.g., the only microcode sequencer of that core and/or processor).

In certain embodiments, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain embodiments, the branch predictor 102 of the processor core 100 divides code into individual blocks (e.g., of a set of contiguous instructions from the program), e.g., by indicating a beginning instruction and/or an end instruction of each block. In certain embodiments, the fetch circuit 104 of the processor core 100 divides code into individual blocks (e.g., of a set of contiguous instructions from the program).

The individual code blocks may then be sent to their respective decode cluster for decoding, for example, with the instructions to-be-decoded for each code block stored in a respective instruction data queue (e.g., instruction data queue 110A as an input queue for decode cluster 108A and instruction data queue 110B as an input queue for decode cluster 108B).

Optionally, processor core 100 includes a (e.g., level one) instruction cache 106, e.g., to cache one or more instructions without having to load them from memory. In certain embodiments, fetch circuit 104 sends code blocks to their respective decode cluster via instruction cache 106. Instruction cache 106 may include an instruction cache tag and/or instruction translation lookaside buffer (TLB).

In certain embodiments, once the code blocks are sent to their corresponding decode cluster 108A-108B (e.g., in instruction data queue 110A for decode cluster 108A and in instruction data queue 110B for decode cluster 108B), decode clusters begin decoding the code blocks in parallel (e.g., via the parallel decoder circuits therein). In certain embodiments, the decode clusters operate independently of each other, so the blocks of code can be decoded out-of-order (e.g., out of program order). In certain embodiments, the allocation circuit 138 is responsible for allocating the operations (e.g., micro-operations) to the execution circuits 140 (e.g., execution units) in the proper program order.

Processor core depicts a first decode cluster 108A with a plurality of decoder circuits 120A-122A in a first set 112A and a second decode cluster 108B with a plurality of decoder circuits 120B-122B in a second set 112B. In certain embodiments, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain embodiments, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one embodiment, a decoder circuit (120A, 122A, 120B, 122B) is to output a certain number of micro-operation per cycle (e.g., one micro-operation per cycle and/or between one and four micro-operations per cycle). In certain embodiments, a "micro-coded" instruction generally refers to an instruction where a decode cluster (e.g., set of decoders) requests the microcode sequencer 128 to load the corresponding set of one or more (e.g., plurality of) micro-operations (μops) from the microcode sequencer memory 132 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or μops).

In certain embodiments, e.g., due to the nature of x86 and/or the need to build a sequencer of many micro-operations, a microcode sequencer is leveraged for many purposes and results in a structure containing numerous (e.g., tens of thousands of) micro-operations. In certain embodiments, since these sequences of micro-operations require significant amounts of storage (e.g., greater than 100 kilobytes (KB)) the microcode sequencer 128 is physically built as a single (e.g., read) ported memory 132 (e.g., ROM) array, with the decode clusters then sharing this single (e.g., only) read port 131 of the microcode sequencer. Sharing the microcode sequencer 128, instead of duplicating it, is a significant die area savings, e.g., because the area of the microcode sequencer 128 is larger than the area of one of the decode clusters.

Since some (e.g., x86) instructions can map to numerous (e.g., 10s, 100s, etc.) corresponding micro-operations (for example, and some of these sequences require behavior that makes the instructions architecturally serializing, e.g., they force everything older to complete and block anything younger from starting), once a decode cluster transfers control into the microcode sequencer 128, that decode cluster must wait until the micro-operations sequence for that instruction completes (e.g., and the microcode sequencer releases control back to the decode cluster). In certain embodiments, microcode sequencer 128 includes an arbitration circuit 130 (e.g., arbitration logic circuit) to arbitrate access to a single decode cluster at a time.

For example, to ensure that processor core 100 does not hang (e.g., owing to architecturally serializing requirements), one embodiment of arbitration circuit 130 only allows the oldest decode cluster (e.g., decode cluster that is decoding the oldest block of instructions in program order) permission to use the microcode sequencer 128. Referring to FIG. 2, code block C is considered older than code block D in program order. In this embodiment, if a younger block of code contains an instruction that requires the use of the microcode sequencer 128, that decode cluster will stall once it detects that instruction, e.g., and the stalled decode cluster will resume decoding once the code block it is decoding becomes the oldest across the other decode cluster(s). However, such decode cluster stalling impacts performance in certain embodiments, e.g., preventing decode clusters from operating in parallel.

In certain instruction sets, there are (e.g., performance sensitive) (e.g., CISC) instructions which have less than a threshold number (e.g., 10) (e.g., arbitration threshold 134) of micro-operations, e.g., and do not require complex protocols (e.g., fencing and/or serialization). In certain embodiments, such an instruction can have its characteristics (e.g., to determine if it is eligible for out-of-order (e.g., for its code block) access to a shared microcode sequencer) generated by a decode cluster, e.g., at the same time that the decode cluster determines (e.g., calculates) the entry point (e.g., address) for this instruction to use when indexing into the memory 132 (e.g., ROM). By knowing the characteristics (e.g., cycle duration to generate the micro-operations for that instruction by the microcode sequencer and/or maximum number of micro-operations that this specific instruction (e.g., its microcode sequence) will require), in certain embodiments it is possible to pre-allocate all the resources necessary within the pipeline to guarantee that upon passing control to the microcode sequencer 128 that it will be released deterministically. For example, with this information, a younger decode cluster (e.g., a decode cluster that is decoding a younger block of instructions in program order) accessing the microcode sequencer 128 for one of these instructions that is to access the microcode sequencer will not pose a functional problem in certain embodiments.

In certain embodiments, each decode cluster (e.g., each decoder circuit in some embodiments) includes a data structure (e.g., as a programmable logic array) to store a corresponding entry point value (e.g., address) for one or more instructions into memory 132 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or bits 118A (for example, (e.g., bypass enable or bypass eligibility) bits indicating the number of cycles to generate the corresponding micro-operations for an instruction and/or the number of micro-operations for the instruction, e.g., as a coded value) for that instruction and/or (2) with data structure 114B of decode cluster 108B including one or more entries that each indicate (e.g., for a single instruction), an entry point 116B for an instruction and/or bits 118B (for example, (e.g., bypass enable or bypass eligibility) bits indicating the number of cycles to generate the corresponding micro-operations for an instruction and/or the number of micro-operations for the instruction, e.g., as a coded value) for that instruction. For example, see the discussion of two bits of coded values below. In certain embodiments, data structure 114A and data structure 114B are copies of each other, e.g., they include the same data. In one embodiment, data structure 114A and data structure 114B are loaded with their data at manufacturing time. In one embodiment, data structure 114A and data structure 114B are loaded with their data during processor boot, e.g., by executing Basic Input/Output System (BIOS) firmware or Unified Extensible Firmware Interface (UEFI) firmware. In one embodiment, data structure 114A and data structure 114B are a programmable logic array. As discussed below, in certain embodiments the arbitration circuit 130 uses the data from data structure 114A and/or data structure 114B to arbitrate access to microcode sequencer 128, e.g., access to (e.g., the only) shared read port 131 to memory 132 (for example, microcode sequencer ROM (MS-ROM)) (for example, (e.g., dedicated) memory within the processor core).

Embodiments herein opportunistically allow out-of-order access to a shared (e.g., read port of a) microcode sequencer, e.g., reducing the amount of time the decode clusters are stalled which improves decode bandwidth and performance. Embodiments herein allow out-of-order access to a shared (e.g., read port of) a microcode sequencer by a decode cluster decoding a younger block of code for instructions that correspond to a sequence of micro-operations below a threshold value, e.g., a number of clock cycles of operation by the microcode sequencer to service the instruction and/or a number of corresponding micro-operations for that instruction in the microcode sequencer. Certain embodiments allow a decode cluster which is decoding a younger block of code to access the microcode sequencer if the decode cluster detects that the instruction only requires the microcode sequencer for less than a particular number of clock cycles. Embodiments herein improve the performance of decode clusters by allowing a decode cluster(s) that is decoding younger code blocks to access the microcode sequencer, e.g., and thus continue to decode instructions as that cluster is not stalled. Use of shared microcode sequencer may be (or not be) used with (e.g., "templated") decoder circuits that decode some instructions into (for example, short, e.g., less than 5 μops) micro-operation flows (e.g., via a programmable logic array) within the decoder circuit, e.g., within a decoder lane. However, to use such a templated decoder, certain embodiments utilize a hint that tells the set of decoders how to align the instruction to that particular decoder lane, e.g., with the hint generated by running an instruction length decode (ILD) block earlier in the pipeline, but running that ILD itself may be a disadvantage as it can hurt performance and power.

After decoding of an instruction into its respective micro-operations (e.g., by decoder circuits or microcode sequencer), in certain embodiments it is stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 132) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 132). Optionally, switch 136 is included to couple output(s) of instruction decode queues 124A-124B to input(s) of allocation circuit 138. In certain embodiments, allocation circuit 138 is to send micro-operations from the instruction decode queues 124A-124B (e.g., in program order) to an execution circuit of execution circuits 140 (for example, based on the type of micro-operation and the type of execution circuit, e.g., integer, vector, floating-point, etc.). In one embodiment, one or more instruction decode queues are loaded out of program order but read in program order. Execution circuits 140 may access storage, e.g., registers 142 and/or data cache 144 (e.g., one or more levels of a cache hierarchy). Once the resultants are generated by the execution circuits 140, a retirement circuit 138 may then retire a corresponding instruction.

Figure 3:
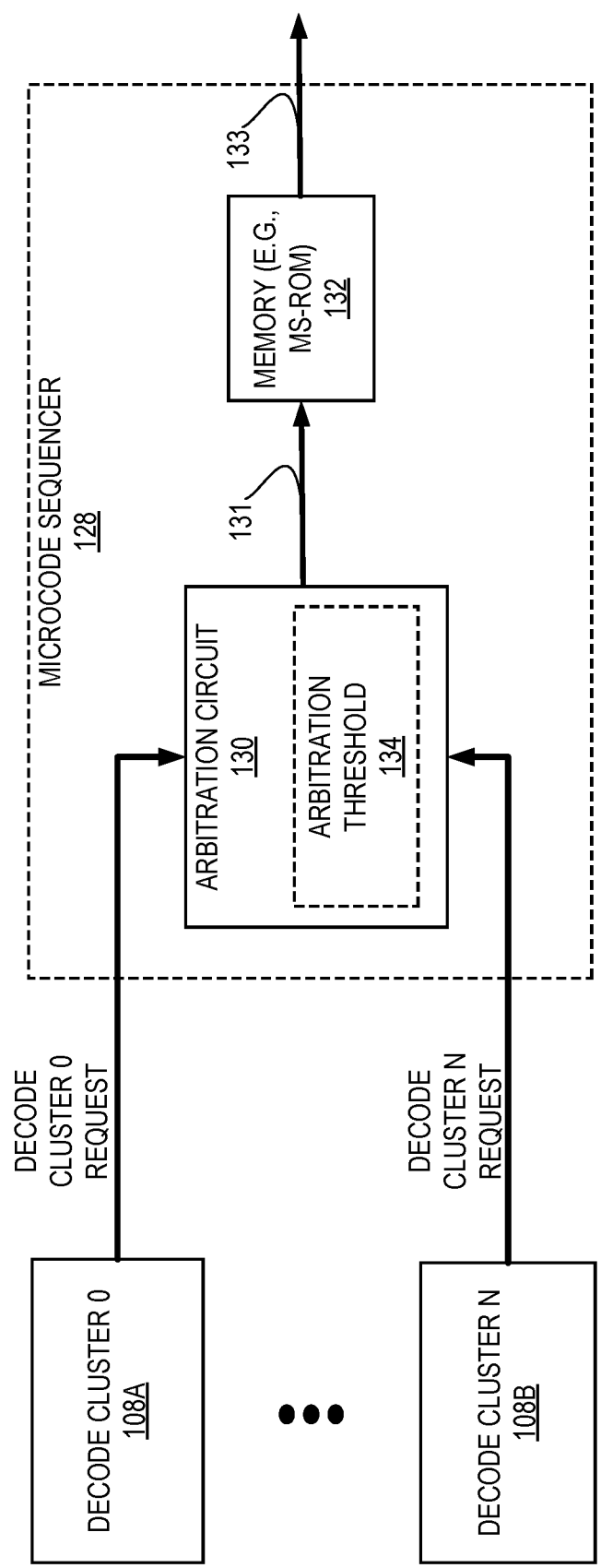
FIG. 3 illustrates an arbitration circuit to arbitrate access to microcode sequencer memory by a plurality of decode clusters according to embodiments of the disclosure.

FIG. 3 illustrates an arbitration circuit 130 to arbitrate access to microcode sequencer memory 132 (e.g., single read port 131) by a plurality of decode clusters 108A-108B according to embodiments of the disclosure. Arbitration circuit 130 may be part of microcode sequencer 128 or elsewhere, e.g., as a separate component of processor core 100 in FIG. 1. A cluster request may include an indication of the number of cycles to generate the corresponding micro-operations for the instruction of the request and/or an indication of the number of micro-operations for the instruction of the request, e.g., looked up in a data structure as discussed herein. An arbitration circuit 130 may determine the number of cycles to generate the corresponding micro-operations for the instruction of the request and/or the number of micro-operations for the instruction of the request, e.g., via its own data structure storing such information. In certain embodiments, arbitration threshold 134 (e.g., which may be set by a user in some embodiments) is a value that indicates when to allow an out-of-order decode access to memory 132. For example, with arbitration threshold 134 being the maximum number of cycles to generate the corresponding micro-operations for the instruction of the request and/or the maximum number of micro-operations for the instruction of the request that are allowed out-or-order access to memory 132. In certain embodiments, decode cluster request is generated by a decode cluster detecting an instruction that is to be serviced by microcode sequencer. In certain embodiments, a decode cluster uses an opcode and/or other information encoded in a macro-instruction to read a data structure to determine if the macro instruction should be serviced by the microcode sequencer 128.

Figure 4:
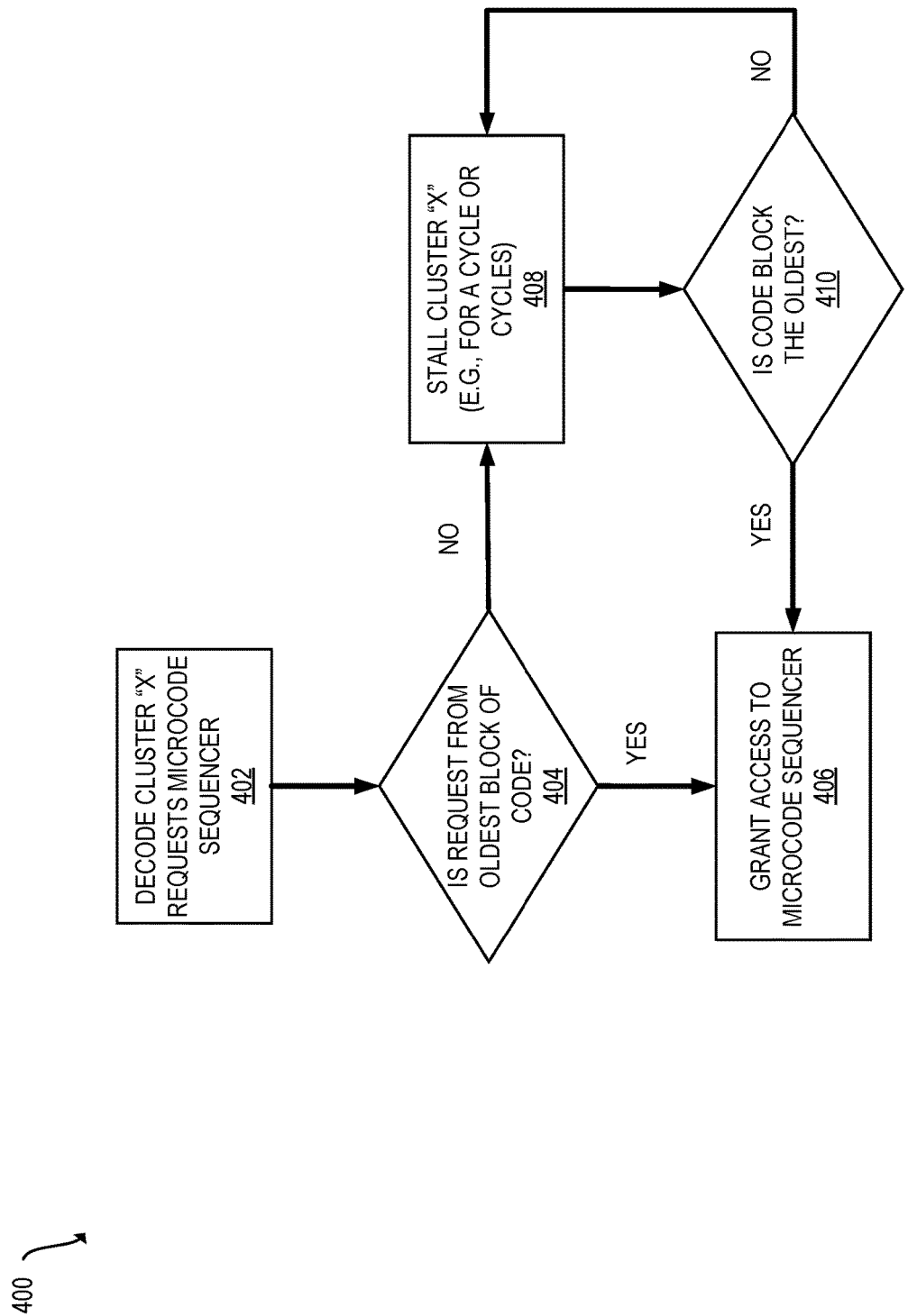
FIG. 4 illustrates a flow diagram for arbitrating in-order access to microcode sequencer memory by a plurality of decode clusters according to embodiments of the disclosure.

FIG. 4 illustrates a flow diagram 400 for arbitrating in-order access to microcode sequencer memory by a plurality of decode clusters according to embodiments of the disclosure. Referring to FIG. 2, code block D is "older" than code block E because code block D is before code block E in program order. Thus, if decode cluster 1 is decoding code block D while cluster 0 is decoding code block E, decode cluster 1 would be decoding the older block of code. One method of arbitrating in-order access only allows the decode cluster which is decoding the oldest block of code access to the microcode sequencer, e.g., if a decode cluster is decoding a younger block of code and it requests the microcode sequencer, that cluster will be stalled until the code block becomes the oldest. For example, and once that code block is the oldest, it can access the microcode sequencer. Flow diagram 400 includes a certain decode cluster (e.g., "X" where X is an identifier of a decode cluster of a plurality of decode clusters) requesting microcode sequencer at 402. At 404, determining if the request is from the oldest block of code being decoded and, if yes, granting access to microcode sequencer at 406 for that request, and, if no at 404, stalling that cluster (e.g., for a certain number of cycles) at 408, and then rechecking at 410 if the request is now from the oldest block of code being decoded (e.g., the decoding of the code block that was the blocking request is completed), and if no at 410, again stalling that cluster (e.g., for a certain number of cycles) at 408, and then rechecking at 410 if the request is now from the oldest block of code being decoded (e.g., the decoding of the code block that was the blocking request is completed), and if yes at 410, granting access to microcode sequencer at 406 for that request.

As one example, assume decode cluster 1 is decoding code block D while cluster 0 is decoding code block E from FIG. 2. If decode cluster 1 decoded an instruction which required the microcode sequencer, decode cluster 1 would be granted access to the microcode sequencer. However, in this example, if decode cluster 0 were to decode an instruction which required the microcode sequencer, cluster 0 would be stalled until cluster 1 started decoding code block F. e.g., once decode cluster 1 starts decoding code block F, decode cluster 0 will be granted access to the microcode sequencer since code block E is "older" than code block F.

However, in certain embodiments there are drawbacks to this arbitration scheme. For example, if the microcode sequencer is not in use by a decode cluster decoding an older code block, a decode cluster decoding a younger code block could use the microcode sequencer for (e.g., CISC) instructions concurrently with the other decode cluster decoding the older code block. With the arbitration scheme in FIG. 4, in certain embodiments a decoder decoding a younger block of code must stall when it detects any (e.g., CISC) instruction that is to use the microcode sequencer even if the microcode sequencer is not in use, e.g., where this stall reduces decode bandwidth and can starve the allocation and execution circuits leading to performance issues.

Next, an example is described in reference to FIG. 2, where decode cluster 0 will decode (e.g., one code block at a time) code blocks A, C, and E and decode cluster 1 will decode (e.g., one code block at a time) code blocks B, D, and F. In one embodiment, code blocks A, C, and E are each a certain number of (e.g., 12-15) instructions which do not require the microcode sequencer and code blocks B, D, and F are each a certain number of (e.g., 4-5) instructions, but one of the (e.g., first three) instructions is an instruction that is to use the microcode sequencer. With this code structure, a processor core could encounter the following scenario: decode cluster 0 starts to decode code block A and decode cluster 1 starts to decode block B, decode cluster 1 stalls immediately because an instruction was detected (e.g., attempted to be decoded) that is to use the microcode sequencer and code block B is younger than code block A; decode cluster 0 completes decoding code block A and starts decoding code block C, and decode cluster 1 resumes decoding code block B because code block B is now the oldest block and can now access the microcode sequencer; decode cluster 1 completes decode of code block B and starts decoding code block D, decode cluster 0 has not completed decoding code block C, and decode cluster 1 stalls immediately because an instruction was detected (e.g., attempted to be decoded) that is to use the microcode sequencer and code block D is younger than code block C. This stalling (e.g., stuttering) prevents decode cluster 0 from decoding instructions in parallel with decode cluster 1 and, has less performance than decoder clusters operating in parallel.

Figure 5:
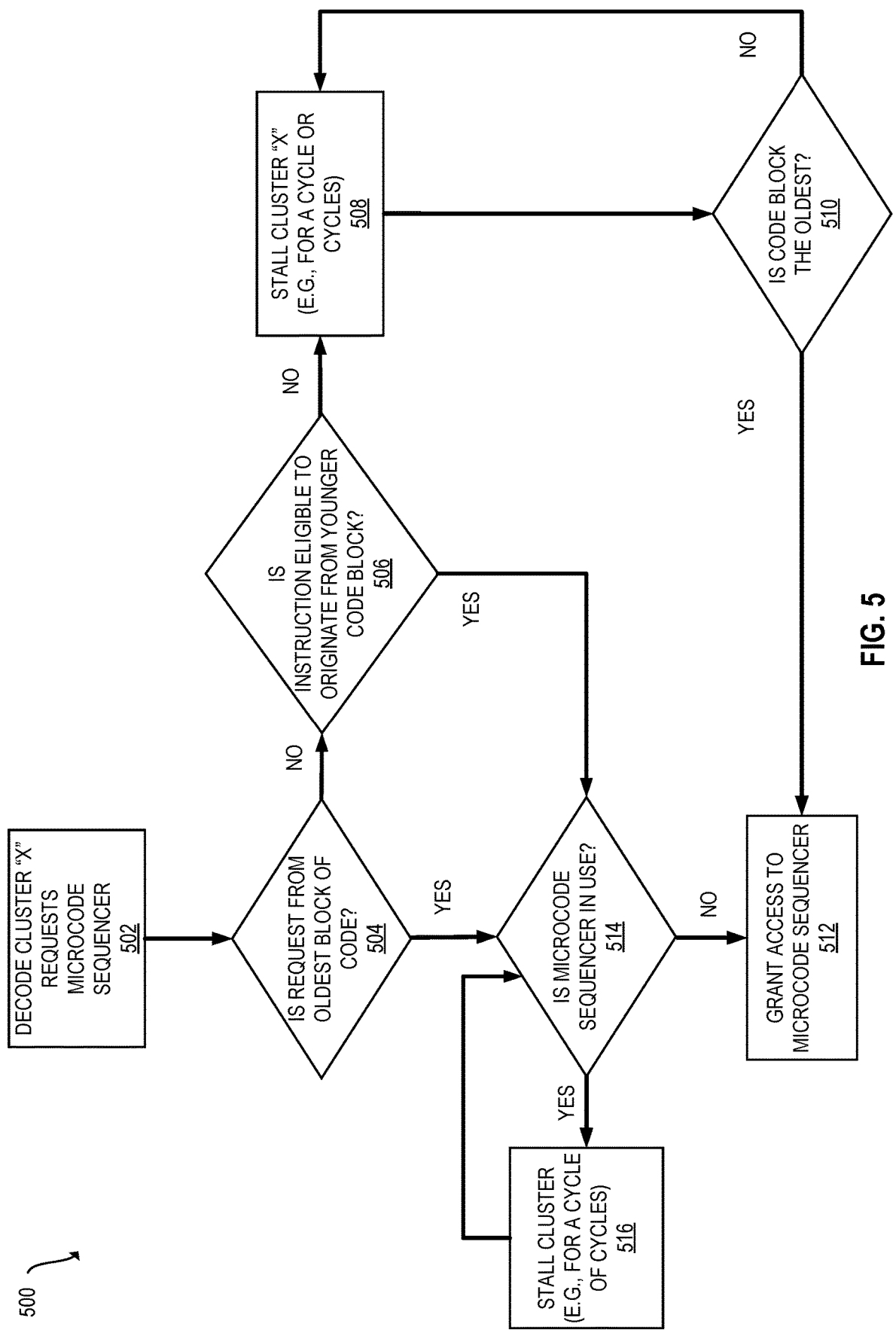
FIG. 5 illustrates a flow diagram for arbitrating out-of-order access to microcode sequencer memory by a plurality of decode clusters according to embodiments of the disclosure.

Embodiments herein addresses this performance issue by improving microcode sequencer access arbitration, e.g., as shown in FIG. 5.

FIG. 5 illustrates a flow diagram 500 for arbitrating out-of-order access to microcode sequencer memory by a plurality of decode clusters according to embodiments of the disclosure. Flow diagram 500 includes a certain decode cluster (e.g., "X" where X is an identifier of a decode cluster of a plurality of decode clusters) requesting microcode sequencer at 502. At 504, determining if the request is from the oldest block of code being decoded and, if yes at 504, checking if the microcode sequencer is in use at 514, and if yes, stalling that cluster (e.g., for a certain number of cycles) at 516, and then rechecking at 514 if the microcode sequencer is in use, and if no at 504, determining if the instruction is eligible to originate from the younger code block at 506, and if yes at 506, checking if the microcode sequencer is in use at 514, and if yes, stalling that cluster (e.g., for a certain number of cycles) at 516, and then rechecking at 514 if the microcode sequencer is in use, and if no at 506, stalling that cluster (e.g., for a certain number of cycles) at 508, and then checking at 510 if the request is now from the oldest block of code being decoded (e.g., the decoding of the code block that was the blocking request is completed), and if no at 510, again stalling that cluster (e.g., for a certain number of cycles) at 508, and then rechecking at 510 if the request is now from the oldest block of code being decoded (e.g., the decoding of the code block that was the blocking request is completed), and if yes at 510, granting access to microcode sequencer at 512 for that request.

In certain embodiments, the check for eligibility at 506 includes (1) checking that the number of cycles (or other time period) to generate the corresponding micro-operations for the instruction of the request is below a threshold (e.g., arbitration threshold 134 in FIGS. 1-2) and/or (2) checking that the number of micro-operations for the instruction of the request is below a threshold (e.g., arbitration threshold 134 in FIGS. 1-2). In certain embodiments, the check for eligibility at 506 includes checking that a corresponding instruction decode queue (e.g., instruction decode queue) has available storage space for the number of micro-operations for the instruction. In certain embodiments, the microcode sequencer includes a single write port 133 that is switched between instruction decode queues, e.g., selecting the instruction decode queue for the decode cluster that was granted access to the microcode sequencer (e.g., shared read port 131 in FIGS. 1-2) for that instruction to store the corresponding micro-operations for that instruction into the correct instruction decode queue. In certain embodiments, the arbitration threshold 134 is stored in storage as in FIGS. 1-2.

In certain embodiments, (1) arbitration threshold 134 (e.g., threshold number of cycles) is compared to the number of cycles (or other time period) to generate the corresponding micro-operations for the instruction of the request and/or (2) arbitration threshold 134 (e.g., threshold number of micro-operations) is compared to the number of micro-operations for the instruction of the request, e.g., and request being granted when the arbitration threshold is (or thresholds are) not exceeded (and/or is equaled). In one embodiment, (1) the number of cycles (or other time period) to generate the corresponding micro-operations for the instruction of the request is indicated by one or more bits (e.g., bypass eligibility bits) supplied with the request for the microcode sequencer, e.g., as determined by searching a data structure (e.g., data structures 114A-114B). In one embodiment, the request includes (i) the entry point (e.g., address) into the memory (for example, memory 132 (e.g., MS-ROM)) storing the micro-operations and (ii) the one or more bits (e.g., bypass eligibility bits) that indicate if the arbitration threshold is exceeded. In certain embodiments, the one or more bits (e.g., bypass eligibility bits) is a plurality of bits, for example, two bits of code values, e.g., where 00 indicates a first number of cycles (e.g., one cycle) or micro-operations (e.g., three micro-operations) for that particular instruction, where 01 indicates a second number of cycles (e.g., two cycles) or micro-operations (e.g., six micro-operations) for that particular instruction, where 10 indicates a third number of cycles (e.g., three cycles) or micro-operations (e.g., nine micro-operations) for that particular instruction, and where 11 indicates a fourth number of cycles (e.g., four or more cycles) or micro-operations (e.g., ten or more micro-operations) for that particular instruction. In one embodiment, arbitration threshold is ten micro-operations, e.g., such that the one or more bits (e.g., bypass eligibility bits) being 00, 01, or 10 in the above example indicate that instruction is eligible for out-or-order use of microcode sequencer and the one or more bits (e.g., bypass eligibility bits) being 11 in the above example indicate that instruction is not eligible for out-or-order use of microcode sequencer, e.g., at 506 in FIG. 5.

Additionally or alternatively, the available storage space (e.g., slots) in the target instruction decode queue is used in an eligibility check, for example, comparing the number of micro-operations for the instruction (e.g., as determined from the one or more bits (e.g., bypass eligibility bits)) to the available storage space (e.g., slots) in the target instruction decode queue, and if that amount of storage space is not available, then that instruction is not eligible for out-or-order use of microcode sequencer, e.g., at 506 in FIG. 5 (e.g., not allow an out-of-order decode access to memory 132).

Embodiments herein include arbitration of access to a microcode sequencer that allows a decode cluster decoding a younger code block to access the microcode sequencer when the microcode sequencer is not in use and the decode cluster (e.g., decoder circuit thereof) detects an (e.g., CISC) instruction which is eligible to originate from the younger code block. Embodiments herein thus improve the performance of the code described above (e.g., in FIG. 2) because decode cluster 1 will not stall when it detects the instruction that is to use the microcode sequencer, and, the decoder clusters can operate in parallel which essentially doubles the decode bandwidth of the decode clusters in comparison to an in-order arbitration scheme.

Figure 6:
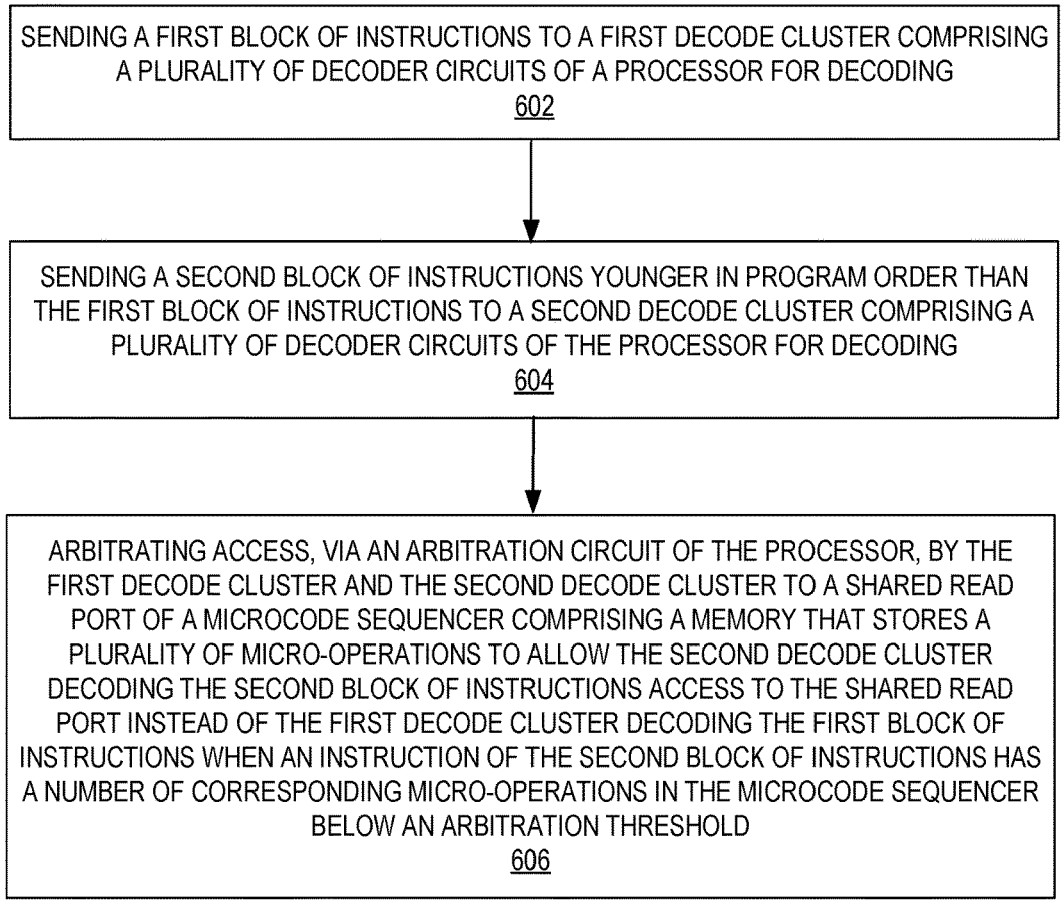
FIG. 6 is a flow diagram illustrating operations for arbitrating out-of-order access to microcode sequencer memory by a plurality of decode clusters according to embodiments of the disclosure.

FIG. 6 is a flow diagram illustrating operations 600 for arbitrating out-of-order access to microcode sequencer memory by a plurality of decode clusters according to embodiments of the disclosure. Some or all of the operations 600 (or other processes described herein, or variations, and/or combinations thereof) are performed under the control of an arbitration circuit (e.g., of a microcode sequencer).

The operations 600 include, at block 602, sending a first block of instructions to a first decode cluster comprising a plurality of decoder circuits of a processor for decoding. The operations 600 further includes, at block 604, sending a second block of instructions younger in program order than the first block of instructions to a second decode cluster comprising a plurality of decoder circuits of the processor for decoding. The operations 600 further include, at block 606, arbitrating access, via an arbitration circuit of the processor, by the first decode cluster and the second decode cluster to a shared read port of a microcode sequencer comprising a memory that stores a plurality of micro-operations to allow the second decode cluster decoding the second block of instructions access to the shared read port instead of the first decode cluster decoding the first block of instructions when an instruction of the second block of instructions has a number of corresponding micro-operations in the microcode sequencer below an arbitration threshold.

Exemplary architectures, systems, etc. that the above may be used in are detailed below.

At least some embodiments of the disclosed technologies can be described in view of the following examples:

Example 1. A hardware processor core comprising:
a first decode cluster comprising a plurality of decoder circuits;
a second decode cluster comprising a plurality of decoder circuits;
a fetch circuit to fetch a first block of instructions and send the first block of instructions to the first decode cluster for decoding, and fetch a second block of instructions younger in program order than the first block of instructions and send the second block of instructions to the second decode cluster for decoding;
a microcode sequencer comprising a memory that stores a plurality of micro-operations; and
an arbitration circuit to arbitrate access by the first decode cluster and the second decode cluster to a shared read port of the memory, wherein the arbitration circuit is to allow the second decode cluster decoding the second block of instructions access to the shared read port of the memory instead of the first decode cluster decoding the first block of instructions when an instruction of the second block of instructions has a number of corresponding micro-operations in the microcode sequencer below an arbitration threshold.

Example 2. The hardware processor core of example 1, wherein the arbitration circuit it to, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the hardware processor core.

Example 3. The hardware processor core of example 2, wherein the stall is a stall of decoding by the second decode cluster.

Example 4. The hardware processor core of example 1, wherein the arbitration circuit is to allow the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

Example 5. The hardware processor core of example 1, wherein the second decode cluster comprises a data structure to store one or more bits that indicate the number of corresponding micro-operations in the microcode sequencer for the instruction of the second block of instructions, and is to send the one or more bits to the arbitration circuit in response to a request to decode the instruction of the second block of instructions.

Example 6. The hardware processor core of example 5, wherein the data structure of the second decode cluster is to store an entry point value that indicates an entry point in the memory for the corresponding micro-operations of the instruction of the second block of instructions, and the second decode cluster is to send the entry point value and the one or more bits to the arbitration circuit in response to the request to decode the instruction of the second block of instructions.

Example 7. The hardware processor core of example 1, wherein the arbitration circuit is to allow the first decode cluster decoding the first block of instructions access to the shared read port of the memory instead of the second decode cluster decoding the second block of instructions when an instruction of the first block of instructions has one or more corresponding micro-operations in the microcode sequencer.

Example 8. The hardware processor core of example 1, wherein the shared read port of the memory is the only read port into the memory of the microcode sequencer.

Example 9. A method comprising:
sending a first block of instructions to a first decode cluster comprising a plurality of decoder circuits of a processor for decoding;
sending a second block of instructions younger in program order than the first block of instructions to a second decode cluster comprising a plurality of decoder circuits of the processor for decoding; and
arbitrating access, via an arbitration circuit of the processor, by the first decode cluster and the second decode cluster to a shared read port of a microcode sequencer comprising a memory that stores a plurality of micro-operations to allow the second decode cluster decoding the second block of instructions access to the shared read port instead of the first decode cluster decoding the first block of instructions when an instruction of the second block of instructions has a number of corresponding micro-operations in the microcode sequencer below an arbitration threshold.

Example 10. The method of example 9, wherein the arbitrating comprises, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the first decode cluster and the second decode cluster.

Example 11. The method of example 10, wherein the stall is a stall of decoding by the second decode cluster.

Example 12. The method of example 9, wherein the arbitrating comprises allowing the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

Example 13. The method of example 9, further comprising:
reading one or more bits from a data structure of the second decode cluster that indicate the number of corresponding micro-operations in the microcode sequencer for the instruction of the second block of instructions; and
sending the one or more bits to the arbitration circuit in response to a request to decode the instruction of the second block of instructions.

Example 14. The method of example 13, further comprising:
reading an entry point value from the data structure of the second decode cluster that indicates an entry point in the memory for the corresponding micro-operations of the instruction of the second block of instructions; and
sending the entry point value and the one or more bits to the arbitration circuit in response to the request to decode the instruction of the second block of instructions.

Example 15. The method of example 9, wherein the arbitrating comprises allowing the first decode cluster decoding the first block of instructions access to the shared read port of the memory instead of the second decode cluster decoding the second block of instructions when an instruction of the first block of instructions has one or more corresponding micro-operations in the microcode sequencer.

Example 16. The method of example 9, wherein the shared read port of the memory is the only read port into the memory of the microcode sequencer.

Example 17. A hardware processor core comprising:
a first decode cluster comprising a plurality of decoder circuits;
a second decode cluster comprising a plurality of decoder circuits;
a branch predictor to identify a first block of instructions and a second block of instructions younger in program order than the first block of instructions, cause the first block of instructions to be sent to the first decode cluster for decoding, and cause the second block of instructions to be sent to the second decode cluster for decoding;
a microcode sequencer comprising a memory that stores a plurality of micro-operations; and
an arbitration circuit to arbitrate access by the first decode cluster and the second decode cluster to a shared read port of the memory, wherein the arbitration circuit is to allow the second decode cluster decoding the second block of instructions access to the shared read port of the memory instead of the first decode cluster decoding the first block of instructions when an instruction of the second block of instructions has a number of corresponding micro-operations in the microcode sequencer below an arbitration threshold.

Example 18. The hardware processor core of example 17, wherein the arbitration circuit it to, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the hardware processor core.

Example 19. The hardware processor core of example 18, wherein the stall is a stall of decoding by the second decode cluster.

Example 20. The hardware processor core of example 17, wherein the arbitration circuit is to allow the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

Example 21. The hardware processor core of example 17, wherein the second decode cluster comprises a data structure to store one or more bits that indicate the number of corresponding micro-operations in the microcode sequencer for the instruction of the second block of instructions, and is to send the one or more bits to the arbitration circuit in response to a request to decode the instruction of the second block of instructions.

Example 22. The hardware processor core of example 21, wherein the data structure of the second decode cluster is to store an entry point value that indicates an entry point in the memory for the corresponding micro-operations of the instruction of the second block of instructions, and the second decode cluster is to send the entry point value and the one or more bits to the arbitration circuit in response to the request to decode the instruction of the second block of instructions.

Example 23. The hardware processor core of example 17, wherein the arbitration circuit is to allow the first decode cluster decoding the first block of instructions access to the shared read port of the memory instead of the second decode cluster decoding the second block of instructions when an instruction of the first block of instructions has one or more corresponding micro-operations in the microcode sequencer.

Example 24. The hardware processor core of example 17, wherein the shared read port of the memory is the only read port into the memory of the microcode sequencer.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the disclosure. FIG. 7B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macro-instructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

In certain embodiments, a prefetch circuit 778 is included to prefetch data, for example, to predict access addresses and bring the data for those addresses into a cache or caches (e.g., from memory 780).

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8B:
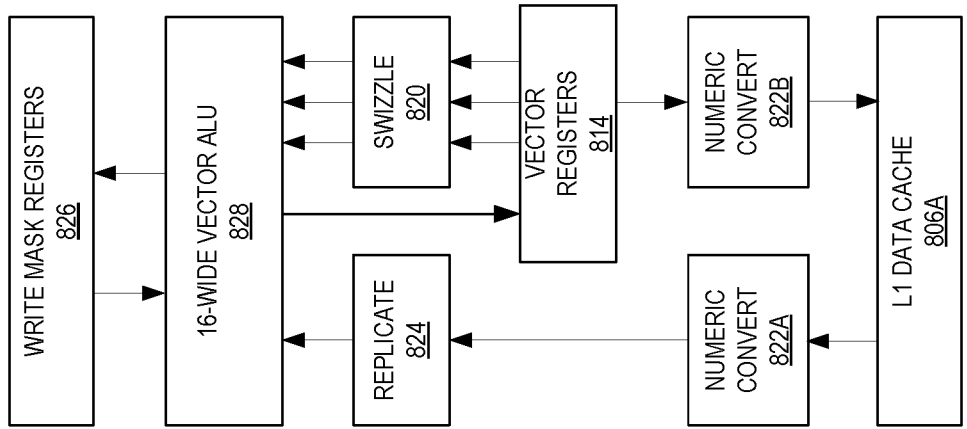
FIG. 8B is an expanded view of part of the processor core in FIG. 8A according to embodiments of the disclosure.
Figure 8A:
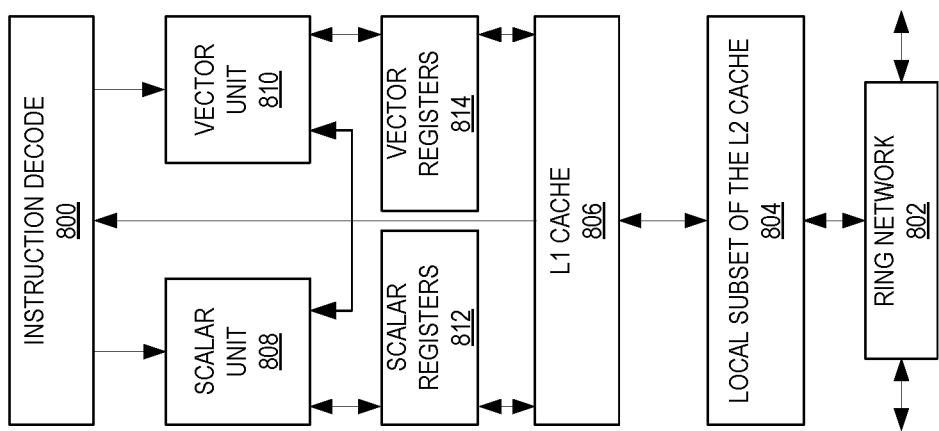
FIG. 8A is a block diagram of a single processor core, along with its connection to the on-die interconnect network and with its local subset of the Level 2 (L2) cache, according to embodiments of the disclosure.

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the disclosure. In one embodiment, an instruction decode unit 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the disclosure may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the disclosure. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
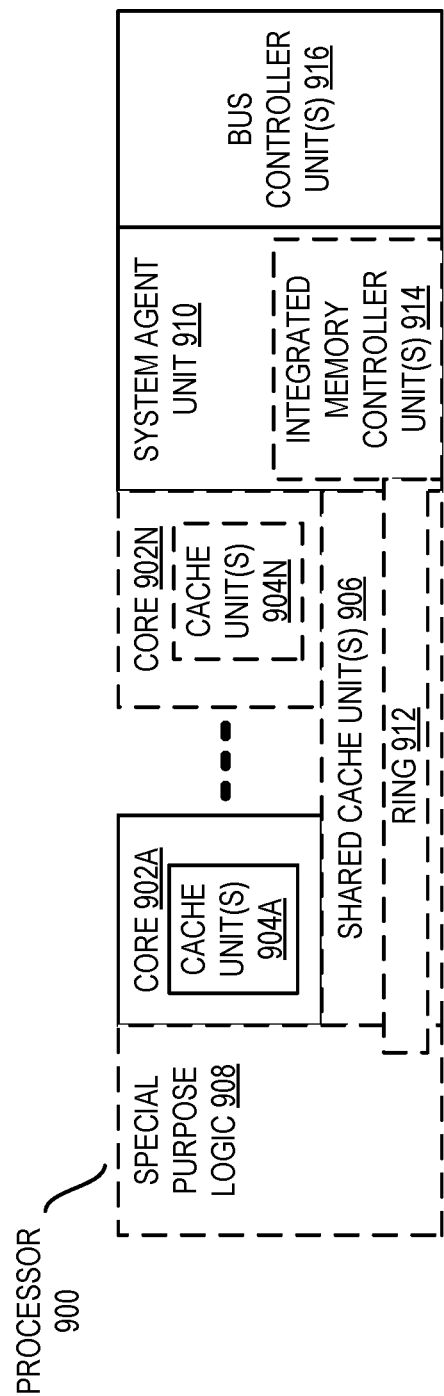
FIG. 9 is a block diagram of a processor that may have more than one core, may have an integrated memory controller, and may have integrated graphics according to embodiments of the disclosure.

FIG. 9 is a block diagram of a processor 900 that may have more than one core, may have an integrated memory controller, and may have integrated graphics according to embodiments of the disclosure. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache 904A-904N within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
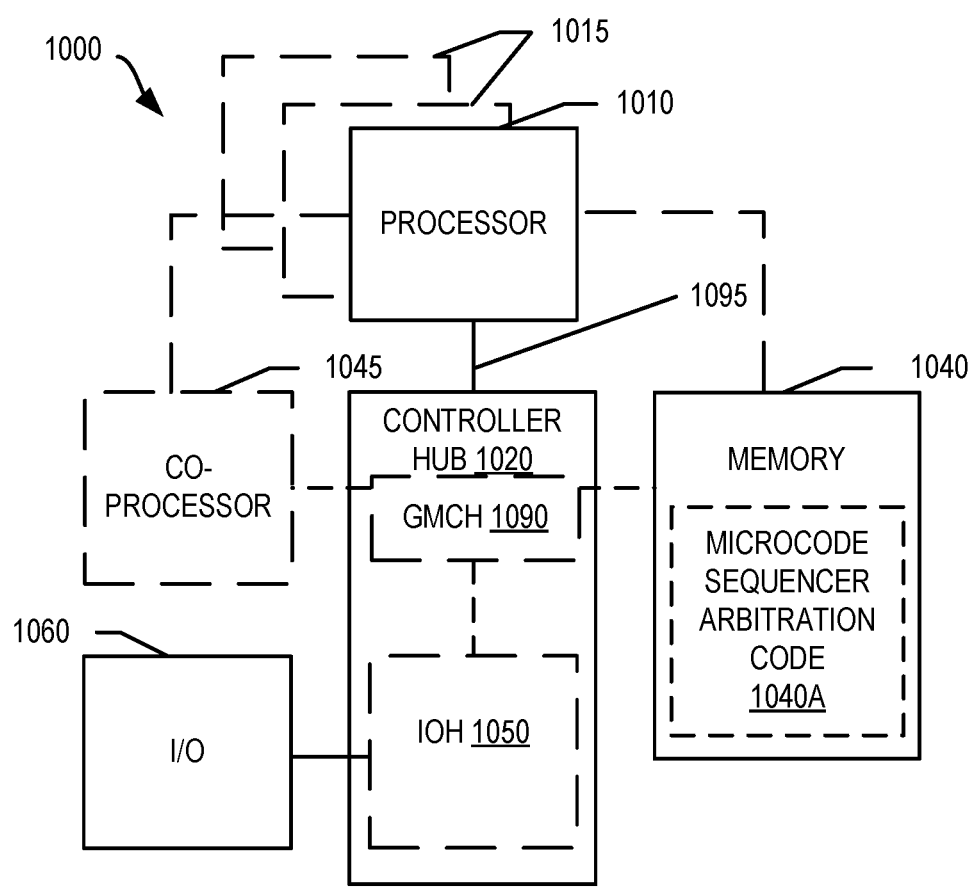
FIG. 10 is a block diagram of a system in accordance with one embodiment of the present disclosure.

Referring now to FIG. 10, shown is a block diagram of a system 1000 in accordance with one embodiment of the present disclosure. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050. Memory 1040 may include microcode sequencer (MS) arbitration code 1040A, for example, to store code that when executed causes a processor to perform any method of this disclosure.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as Quickpath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
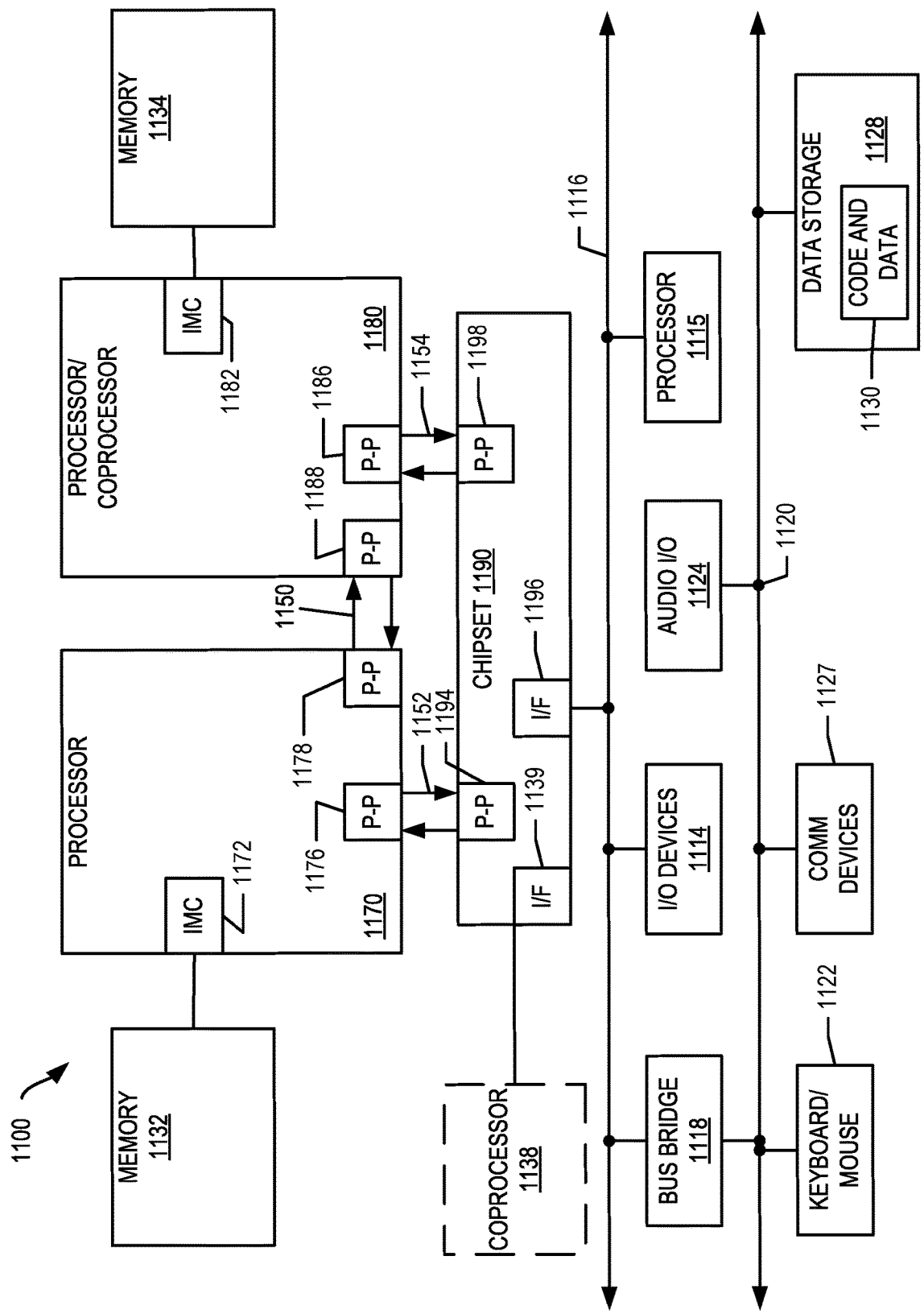
FIG. 11 is a block diagram of a more specific exemplary system in accordance with an embodiment of the present disclosure.

Referring now to FIG. 11, shown is a block diagram of a first more specific exemplary system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the disclosure, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
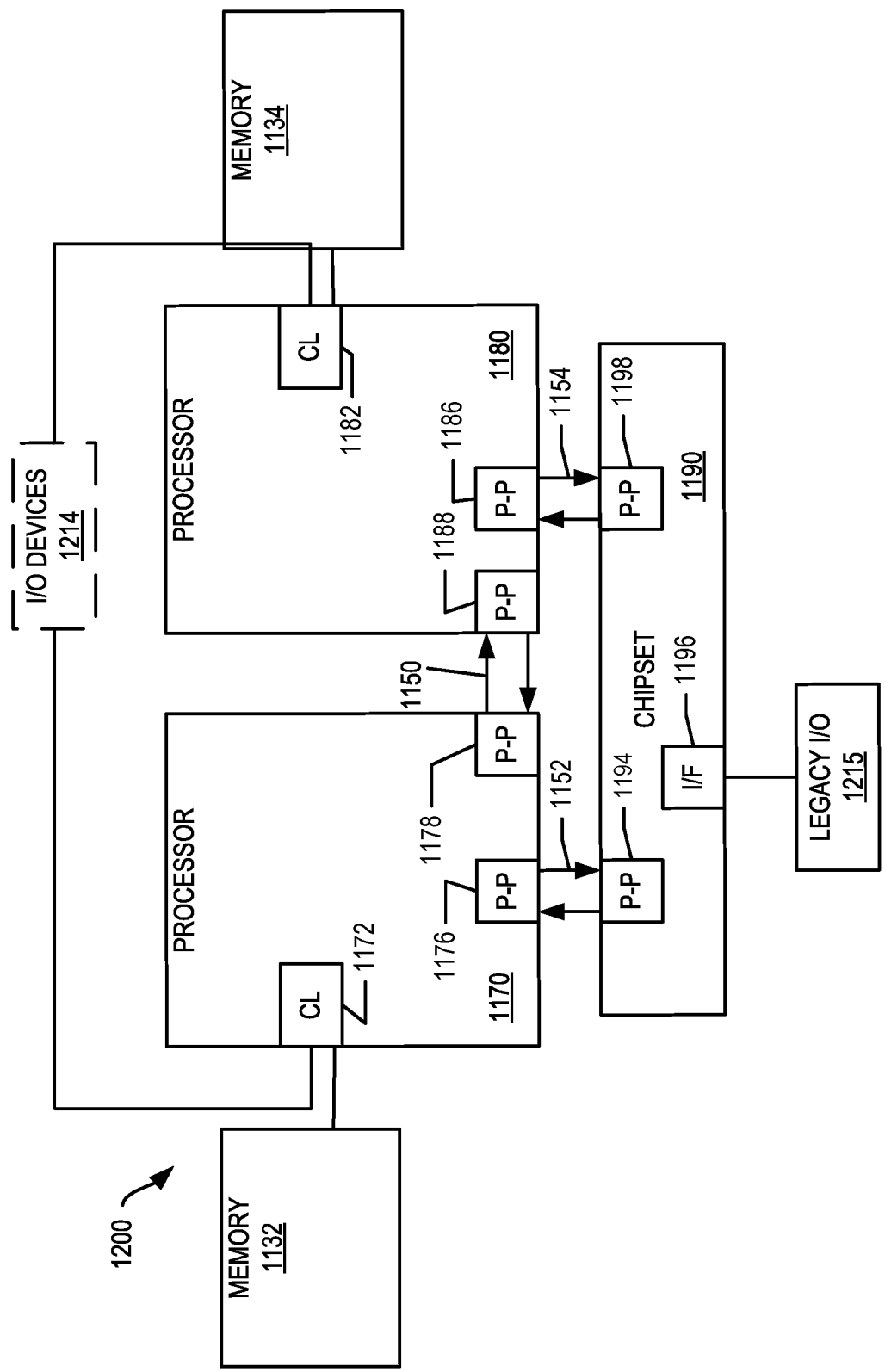
FIG. 12, shown is a block diagram of a second more specific exemplary system in accordance with an embodiment of the present disclosure.

Referring now to FIG. 12, shown is a block diagram of a second more specific exemplary system 1200 in accordance with an embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
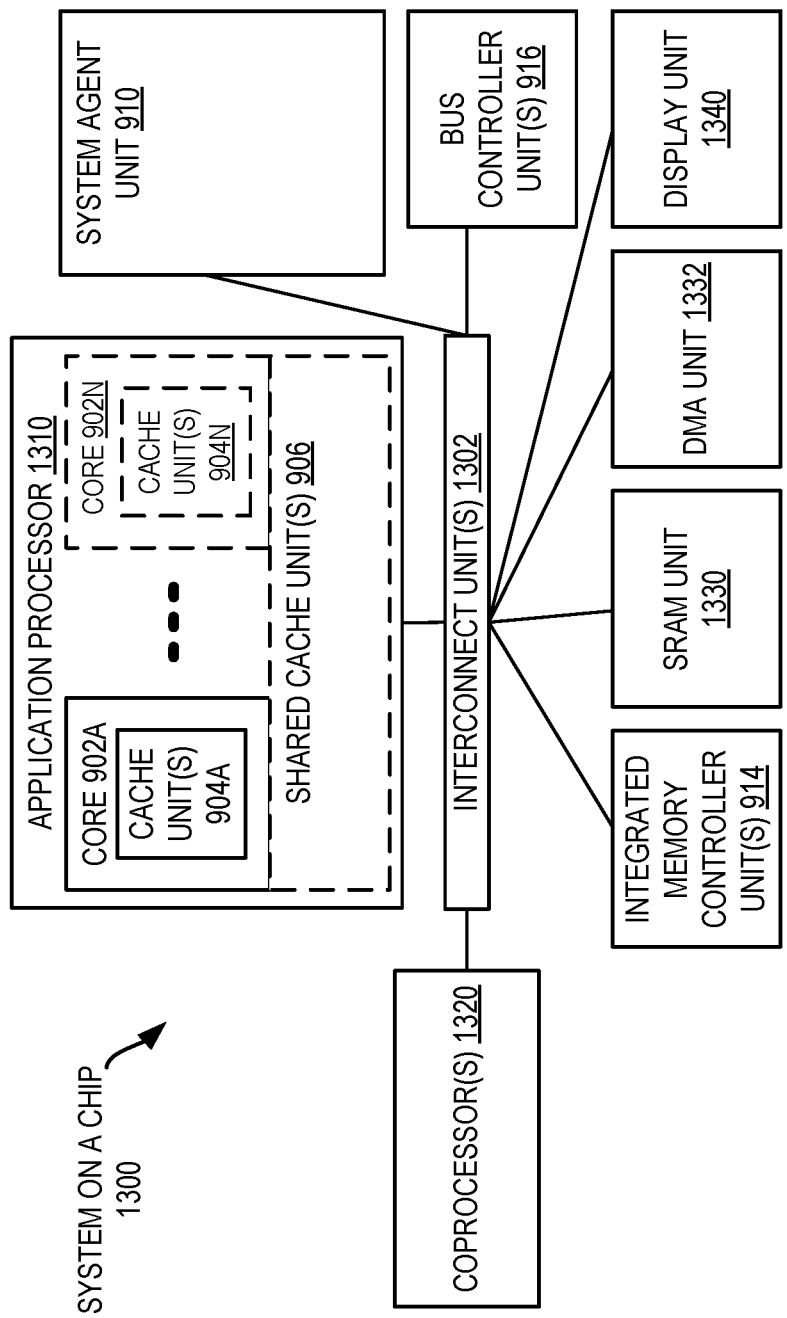
FIG. 13, shown is a block diagram of a system on a chip (SoC) in accordance with an embodiment of the present disclosure.

Referring now to FIG. 13, shown is a block diagram of a SoC 1300 in accordance with an embodiment of the present disclosure. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
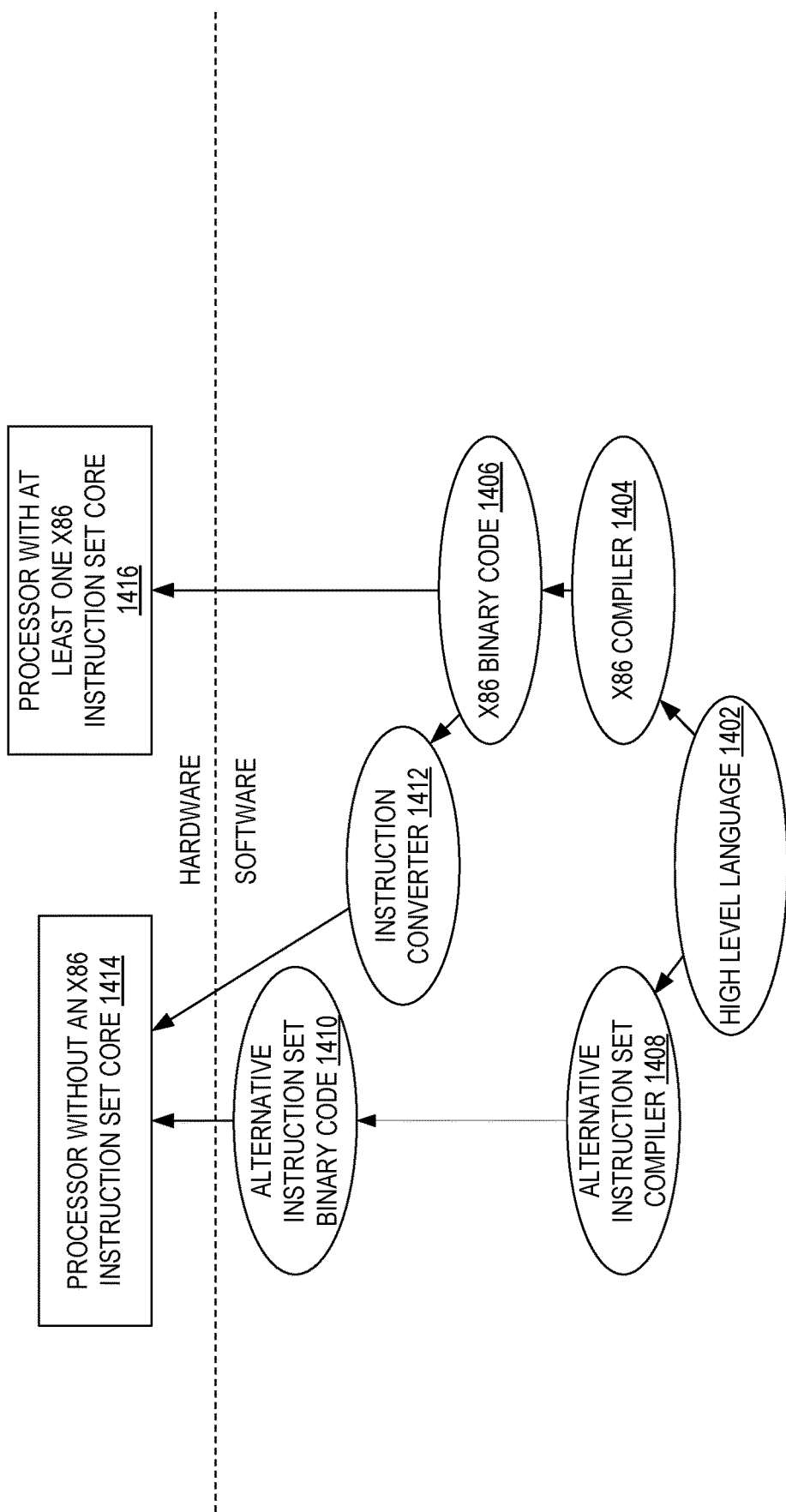
FIG. 14 is a block diagram contrasting the use of a software instruction converter to convert binary instructions in a source instruction set to binary instructions in a target instruction set according to embodiments of the disclosure.

FIG. 14 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

What is claimed is:

1. A hardware processor core comprising:
    a first decode cluster comprising a plurality of decoder circuits;
    a second decode cluster comprising a plurality of decoder circuits;
    a fetch circuit to fetch a first block of instructions and send the first block of instructions to the first decode cluster for decoding, and fetch a second block of instructions younger in program order than the first block of instructions and send the second block of instructions to the second decode cluster for decoding;
    a microcode sequencer comprising a memory that stores a plurality of micro-operations; and
    an arbitration circuit to arbitrate access by the first decode cluster and the second decode cluster to a shared read port of the memory, wherein the arbitration circuit is to allow the second decode cluster decoding the second block of instructions access to the shared read port of the memory instead of the first decode cluster decoding the first block of instructions when an instruction of the second block of instructions has a number of corresponding micro-operations in the microcode sequencer below an arbitration threshold.

2. The hardware processor core of claim 1, wherein the arbitration circuit it to, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the hardware processor core.

3. The hardware processor core of claim 2, wherein the stall is a stall of decoding by the second decode cluster.

4. The hardware processor core of claim 1, wherein the arbitration circuit is to allow the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

5. The hardware processor core of claim 1, wherein the second decode cluster comprises a data structure to store one or more bits that indicate the number of corresponding micro-operations in the microcode sequencer for the instruction of the second block of instructions, and is to send the one or more bits to the arbitration circuit in response to a request to decode the instruction of the second block of instructions.

6. The hardware processor core of claim 5, wherein the data structure of the second decode cluster is to store an entry point value that indicates an entry point in the memory for the corresponding micro-operations of the instruction of the second block of instructions, and the second decode cluster is to send the entry point value and the one or more bits to the arbitration circuit in response to the request to decode the instruction of the second block of instructions.

7. The hardware processor core of claim 1, wherein the arbitration circuit is to allow the first decode cluster decoding the first block of instructions access to the shared read port of the memory instead of the second decode cluster decoding the second block of instructions when an instruction of the first block of instructions has one or more corresponding micro-operations in the microcode sequencer.

8. The hardware processor core of claim 1, wherein the shared read port of the memory is the only read port into the memory of the microcode sequencer.

9. A method comprising:
    sending a first block of instructions to a first decode cluster comprising a plurality of decoder circuits of a processor for decoding;
    sending a second block of instructions younger in program order than the first block of instructions to a second decode cluster comprising a plurality of decoder circuits of the processor for decoding; and
    arbitrating access, via an arbitration circuit of the processor, by the first decode cluster and the second decode cluster to a shared read port of a microcode sequencer comprising a memory that stores a plurality of micro-operations to allow the second decode cluster decoding the second block of instructions access to the shared read port instead of the first decode cluster decoding the first block of instructions when an instruction of the second block of instructions has a number of corresponding micro-operations in the microcode sequencer below an arbitration threshold.

10. The method of claim 9, wherein the arbitrating comprises, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the first decode cluster and the second decode cluster.

11. The method of claim 10, wherein the stall is a stall of decoding by the second decode cluster.

12. The method of claim 9, wherein the arbitrating comprises allowing the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

13. The method of claim 9, further comprising:
    reading one or more bits from a data structure of the second decode cluster that indicate the number of corresponding micro-operations in the microcode sequencer for the instruction of the second block of instructions; and sending the one or more bits to the arbitration circuit in response to a request to decode the instruction of the second block of instructions.

14. The method of claim 13, further comprising:

reading an entry point value from the data structure of the second decode cluster that indicates an entry point in the memory for the corresponding micro-operations of the instruction of the second block of instructions; and sending the entry point value and the one or more bits to the arbitration circuit in response to the request to decode the instruction of the second block of instructions.

15. The method of claim 9, wherein the arbitrating comprises allowing the first decode cluster decoding the first block of instructions access to the shared read port of the memory instead of the second decode cluster decoding the second block of instructions when an instruction of the first block of instructions has one or more corresponding micro-operations in the microcode sequencer.

16. The method of claim 9, wherein the shared read port of the memory is the only read port into the memory of the microcode sequencer.

17. A hardware processor core comprising:

a first decode cluster comprising a plurality of decoder circuits;

a second decode cluster comprising a plurality of decoder circuits;

a branch predictor to identify a first block of instructions and a second block of instructions younger in program order than the first block of instructions, cause the first block of instructions to be sent to the first decode cluster for decoding, and cause the second block of instructions to be sent to the second decode cluster for decoding;

a microcode sequencer comprising a memory that stores a plurality of micro-operations; and an arbitration circuit to arbitrate access by the first decode cluster and the second decode cluster to a shared read port of the memory, wherein the arbitration circuit is to allow the second decode cluster decoding the second block of instructions access to the shared read port of the memory instead of the first decode cluster decoding the first block of instructions when an instruction of the second block of instructions has a number of corresponding micro-operations in the microcode sequencer below an arbitration threshold.

18. The hardware processor core of claim 17, wherein the arbitration circuit it to, when the instruction of the second block of instructions has the number of corresponding micro-operations in the microcode sequencer above or equal to the arbitration threshold, cause a stall of access to the shared read port of the memory of the microcode sequencer by the second decode cluster until the second block of instructions is an oldest block of instructions in program order being decoded by the hardware processor core.

19. The hardware processor core of claim 18, wherein the stall is a stall of decoding by the second decode cluster.

20. The hardware processor core of claim 17, wherein the arbitration circuit is to allow the second decode cluster decoding the second block of instructions access to the shared read port of the memory instead of the first decode cluster decoding the first block of instructions when the instruction of the second block of instructions has the number of corresponding micro-operations in the microcode sequencer below the arbitration threshold and an instruction decode queue of the second decode cluster has available storage space for the number of corresponding micro-operations.

21. The hardware processor core of claim 17, wherein the second decode cluster comprises a data structure to store one or more bits that indicate the number of corresponding micro-operations in the microcode sequencer for the instruction of the second block of instructions, and is to send the one or more bits to the arbitration circuit in response to a request to decode the instruction of the second block of instructions.

22. The hardware processor core of claim 21, wherein the data structure of the second decode cluster is to store an entry point value that indicates an entry point in the memory for the corresponding micro-operations of the instruction of the second block of instructions, and the second decode cluster is to send the entry point value and the one or more bits to the arbitration circuit in response to the request to decode the instruction of the second block of instructions.

23. The hardware processor core of claim 17, wherein the arbitration circuit is to allow the first decode cluster decoding the first block of instructions access to the shared read port of the memory instead of the second decode cluster decoding the second block of instructions when an instruction of the first block of instructions has one or more corresponding micro-operations in the microcode sequencer.

24. The hardware processor core of claim 17, wherein the shared read port of the memory is the only read port into the memory of the microcode sequencer.

* * * * *